United States Patent [19]
McKinney

[11] Patent Number: 6,119,956
[45] Date of Patent: *Sep. 19, 2000

[54] SNOW GUN FOR MAKING ARTIFICIAL SNOW

[76] Inventor: Vernon Lorne McKinney, 119 Senic Ridge Court N.W., Calgary, Alberta, Canada, T3L 1V2

[ * ] Notice: This patent is subject to a terminal disclaimer.

[21] Appl. No.: 09/298,506

[22] Filed: Apr. 22, 1999

Related U.S. Application Data

[62] Division of application No. 09/063,607, Apr. 21, 1998, Pat. No. 5,979,785, which is a continuation of application No. 08/551,162, Oct. 31, 1995, Pat. No. 5,810,251.

[51] Int. Cl.[7] .................................................. F25C 3/04
[52] U.S. Cl. ........................ 239/14.2; 239/418; 138/114; 285/405; 285/412; 403/335; 403/337
[58] Field of Search ................................... 239/2.2, 14.2, 239/418, 426, 433; 138/114; 285/405, 412; 403/335, 337

[56] References Cited

U.S. PATENT DOCUMENTS

| | | | |
|---|---|---|---|
| 3,706,414 | 12/1972 | Dupre | 239/14.2 |
| 3,822,825 | 7/1974 | Dupre | 239/14.2 X |
| 3,952,949 | 4/1976 | Dupre | 239/2.2 |
| 3,979,061 | 9/1976 | Kircher | 239/2.2 |
| 4,199,103 | 4/1980 | Dupre | 239/14.2 |
| 4,742,959 | 5/1988 | Stanchak et al. | 239/14.2 |
| 4,993,635 | 2/1991 | Dupre | 239/14.2 |
| 5,004,151 | 4/1991 | Dupre | 239/14.2 X |
| 5,180,105 | 1/1993 | Teague | 239/14.2 |
| 5,360,163 | 11/1994 | Dupre | 239/14.2 |

OTHER PUBLICATIONS

Brochure—Snow Economics Snowmaking Consulting—The HKD Tower Snowgun.

*Primary Examiner*—Andres Kashnikow
*Assistant Examiner*—Steven J. Ganey
*Attorney, Agent, or Firm*—Dennis T. Griggs

[57] ABSTRACT

In a snow gun, each of air and water are discharged through V-jet nozzles in the form of generally flat and V-shaped jets or sprays. The nozzles are spacially positioned and angled so that the air jet intersects the water spray along a line of intersection where they are of equal width. This provides efficient atomization of the water with the result that snow can be made at milder freezing temperature.

2 Claims, 11 Drawing Sheets

SNOW GUN FOR MAKING ARTIFICIAL SNOW

CROSS REFERENCE TO RELATED APPLICATIONS

This a division of application Ser. No. 09/063,607 filed Apr. 21, 1998, now U.S. Pat. No. 5,979,785, which is a continuation of application Ser. No. 08/551,162 filed Oct. 31, 1995, now U.S. Pat. No. 5,810,251.

FIELD OF THE INVENTION

The present invention relates to method and apparatus for making artificial snow.

BACKGROUND OF THE INVENTION

In general, artificial snow-making involves atomizing a spray of water with a jet of air to create a plume of very fine water droplets which nucleate and form snow as the plume drops to earth under freezing temperature conditions.

The present invention is a modification of a known snow-making system patented and commercialized by Herman K. Dupre.

In U.S. Pat. No. 3,706,414, issued Dec. 19, 1972, Dupre taught bringing pressurized air and water through separate flowlines to the bases of hillside towers positioned along a ski trail. The air and water were introduced at controlled rates into a mixing chamber positioned at the foot of each tower. The mixture then flowed upwardly through a conduit forming the tower and was discharged through nozzles. Inherent in this system were the following features:

- some atomization or reduction in water droplet size due to mixing with air;
- rapid cooling of the water widen the pressurized air was released into the freezing atmosphere and it expanded;
- the provision of dwell time as the plume fell to earth from an elevated starting point; and
- some control over the air/water ratio, with a view to optimizing it.

In a subsequent U.S. Pat., No. 3,822,825 issued Jul. 9, 1974, Dupre taught bringing the water and air separately up the tower in inner and outer, concentric, spaced apart conduits. The air flowed through the inner conduit passageway and the water through the outer annular passageway formed between the conduits. As a result, the water stream functioned to insulate the air stream. There is moisture in the air and it will condense and freeze to form "rime ice" if the atmospheric temperature is low enough and the air stream becomes chilled sufficiently. In another aspect taught, the air was delivered to a tee and released into the atmosphere through a pair of diametrically opposed orifices. These orifices were holes drilled through the wall of the outer conduit, to communicate with the bore of the tee. Dupre taught that the air outlet should be flush with the outer surface of the outer conduit, to avoid cooling of the air while passing through the orifice with consequent formation of rime ice, which could block the orifice. Dupre further taught discharging the water through a nozzle angled at 45° relative to the long axis of the conduit and having a shaped orifice adapted to deliver a substantially flat and V-shaped spray. This air orifice was positioned just above the water nozzle and was angled at about 90° relative to the long axis of the conduit. The term "associated pair" is used herein to denote a pair of outlets arranged so that the air jet and water spray which they produce intersect with the result that the air atomizes the water and a nucleated plume is produced. The air orifice was positioned to discharge its jet into the throat of the water spray. In another feature, Dupre taught mounting diametrically opposed associated pairs of air orifices and water nozzles, each pair being at a common elevation. This arrangement is referred to as providing a "bank" of associated pairs of air orifices water nozzles. Inherent in this design were the following concepts:

- bringing the air and water through separate conduits to the discharge elevation;
- using the water stream to insulate the air stream until it was discharged to the atmosphere;
- associating the air orifice and water nozzle in a spatial arrangement such that the air jet would converge with and contact the central portion or throat of the water spray, to cause atomization; and
- utilizing a bank of air and water outlets.

In a still more recent patent, U.S. Pat. No. 5,004,151 issued Apr. 2, 1991, Dupre addressed the need to increase snow production capacity. A discrete snow gun was attached to the upper end of a conduit tower secured to a vertical post. The snow gun had an associated pair of water and air outlets, comprising a water nozzle and an air orifice. A second water nozzle was inwardly spaced along the gun from the outer water nozzle of the associated pair. The second water nozzle was inclined at a more acute angle than the first water nozzle, so that the water spray of the second nozzle would converge into and contact the plume produced by the associated pair. In this way, the available single jet of air was used to atomize the two sprays of water.

The Dupre system has won commercial success. The commercial version incorporates the features described above. It can be described more specifically as follows:

- a snow gun is mounted on a boom or tower having universal movement;
- the gun has two banks of V-jet water nozzles spaced along the long axis of the gun;
- a single bank of air orifices is associated with the outer water bank;
- the inner bank of water nozzles directs its sprays into the nucleated sprays of the outer bank; and
- coaxial water and air conduits form the body of the gun and provide an annular outer passageway for supplying pressurized water to the two banks of water nozzles and an insulated inner passageway for supplying pressurized air to the single bank of air orifices.

While the Dupre system has been an admirable success, there are still certain shortcomings which could be improved upon. More particularly:

- the Dupre system is not capable of producing quality snow at freezing temperatures milder than –6° C. using a water volume that would be commercially viable. The literature indicates that the system can only operate at –6° C. with a low humidity of about 60%. There are many ski areas that have a significant number of days during the season when the temperature is milder than –6° C. There is therefore a need to develop a system which can operate at milder freezing temperatures;
- it is always desirable to increase the snow-making capacity of the snow gun;
- there is a need to provide a snow gun which can be used without air when the temperature is cold; and
- there is a need to provide a flanged snow gun that is disconnectable from the tower, or easy removal to permit service to the snow gun and to permit replacement with a snow gun having upgraded components.

It is an objective of the present invention to provide a snow gun which satisfies these needs.

By way of further background, it is pointed out that the V-jet nozzles used in the art are classified by the designations 5020, 5040 and 5060. A 5020 nozzle produces a flat, V-shaped spray having an angularity of about 50° and discharges 2 U.S. gpm of water, when operated at 40 psi. A 5040 nozzle produces a similar spray at 4 U.S. gpm at 40 psi. And the 5060 nozzle produces a similar spray at 6 U.S. gpm at 40 psi. If the pressure is increased, all of the nozzles will deliver more water at a wider angle.

SUMMARY OF THE INVENTION

In the one feature of the present invention, an air nozzle which produces a substantially flat and V-shaped air jet is associated with a water nozzle which produces a substantially flat and V-shaped water spray, in the context of a snow gun, the two nozzles being spacially arranged or coupled so that the air jet and water spray converge and intersect along a line where their widths are substantially equal. The phase "coupled pair" is used to denote an air nozzle and water nozzle pair as described in the previous sentence. A coupled pair is a specific embodiment of an associated pair.

When a snow gun leaving a coupled pair of air and water outlets, as described is operated, a remarkably efficient and complete atomization of the water into very fine droplets is achieved. This degree of atomization has enabled the gun to produce snow at −1½° C. at 85% humidity.

In another feature, a plurality of banks of associated pairs of air and water outlets are spaced along the length of a snow gun. The associated pairs are oriented so that the plumes which they produce do not significantly converge and intersect. For example, the water nozzles of one bank can be similarly angled relative to those of the next bank so that the plumes travel substantially in parallel. By implementing this feature, efficient and complete nucleation of multiple water sprays is obtained while increasing the snow-making capacity of the gun relative to the prior art. The water spray of one bank does not intersect that of another. In a preferred embodiment, the multiple, spaced apart, associated pairs of air and water outlets are provided in the form of coupled pairs.

The air nozzle preferably should be embedded in the wall structure forming the air and water conduits of the snow gun, to minimize the formation of rime ice.

To provide more than one bank of embedded air nozzles has required the development of a unique conduit structure and fabrication process. This has been achieved and is described hereunder.

As a result, it is now possible to provide in a snow gun multiple coupled pairs of air and water outlets along the length of the gun, each involving V-jet nozzles for both air and water. This has meant that the snow-making capacity of the gun can be increased by using a plurality of banks of coupled pairs and each V shaped water spray is individually atomized by its own V shaped air jet. The nozzles of the water banks are angled so that their produced plumes are non-converging; thus one water nozzle does not significantly increase the water droplet size of another.

By providing air and water outlets that each incorporate V-jet nozzles, one can now provide a 5020 nozzle in one outlet and a 5040 nozzle in the other outlet. One then has the option of supplying each of water or air to either the 5020 nozzle or the 5040 nozzles by changing over the fluid supply lines at the base of the tower. Thus, in cold weather when the air/water ratio can be low, one can supply the water through the 5040 nozzle and the air through the 5020 nozzle, with high snow output. In milder weather, when the air/water ratio needs to be higher, one can supply the water through the 5020 nozzle and the air through the 5040 nozzle—the snow output is diminished but the increased atomization due to higher energy input results in filler water droplets being produced; these filler droplets have a better chance of forming snow at the mild conditions.

If desired, at cold temperatures the air can be shut right off and water sprayed through the 5020 nozzle will make snow at an adequate rate without the cost of air compression and without coping with air nozzle freeze up problems. At very cold temperatures, both nozzles can be supplied with water alone.

In summary so far then, the attributes of a system incorporating features of the invention can include:

improved atomization, which leads to finer droplet size and the ability to nucleate and form snow at freezing temperatures milder than −6° C.;

more complete atomization, as the entire width of the water spray preferably is contacted by the air jet;

increased snow-making capacity, as more water banks can now be incorporated into a single snow gun and their sprays can be independently nucleated;

versatility, in that nozzles of different capacity can be used in a coupled pair and the nature of the fluid discharge of these nozzles can be switched from ground; and the option to terminate air supply during cold weather conditions.

Broadly stated, in one aspect the invention is embodied in a snow gun for making artificial snow, comprising: an inner conduit having a wall forming a first passageway, extending longitudinally of the gun, for delivering a stream of pressurized air; an outer conduit having a wall combining with the inner conduit to form a second passageway, also extending longitudinally of the gun, for delivering a stream of pressurized water; the first passageway extending through the second passageway; a water nozzle connected with the outer conduit and communicating with the second passageway for the discharge of water therefrom, said water nozzle having an orifice operative to produce a substantially flat and V-shaped water spray; an air nozzle connected with the inner conduit and communicating with the first passageway for the discharge of air therefrom, said air nozzle having an orifice operative to produce a substantially flat and V-shaped air jet; the air nozzle being associated with the water nozzle as a coupled pair so that the water spray and the air jet produced converge and intersect along a line where their widths are substantially equal.

The foregoing paragraph states the snow gun in the context of the way that it will be operated for at least part of the time—that is, with air passing through the core passageway and water through the outer passageway. However, as previously outlined, it is contemplated to be within the scope of the invention that the streams can be reversed or only water alone will be flowed through both passageways.

In still another aspect, the invention comprises providing a flanged connection connecting the lower end of the gun to the upper end of the tower, said connection forming dual sealed openings for connecting the air and water passageways of the tower and gun, so that the streams may pass through the connection without leakage.

In another aspect, the invention is embodied in a method for making snow at freezing temperatures, comprising: supplying water under pressure to a water nozzle forming part of a snow gun elevated above ground and discharging the water from the nozzle in the form of a substantially flat and V-shaped spray; simultaneously supplying air under pressure to an air nozzle forcing part of the snow gun and discharging the air from the nozzle in the form of a substantially flat and V-shaped jet; and directing the nozzles so that the spray and jet converge and intersect along a line where their widths are substantially equal.

DETAILED DESCRIPTION OF THE PREFERRED EMBODIMENT

Figure 1:
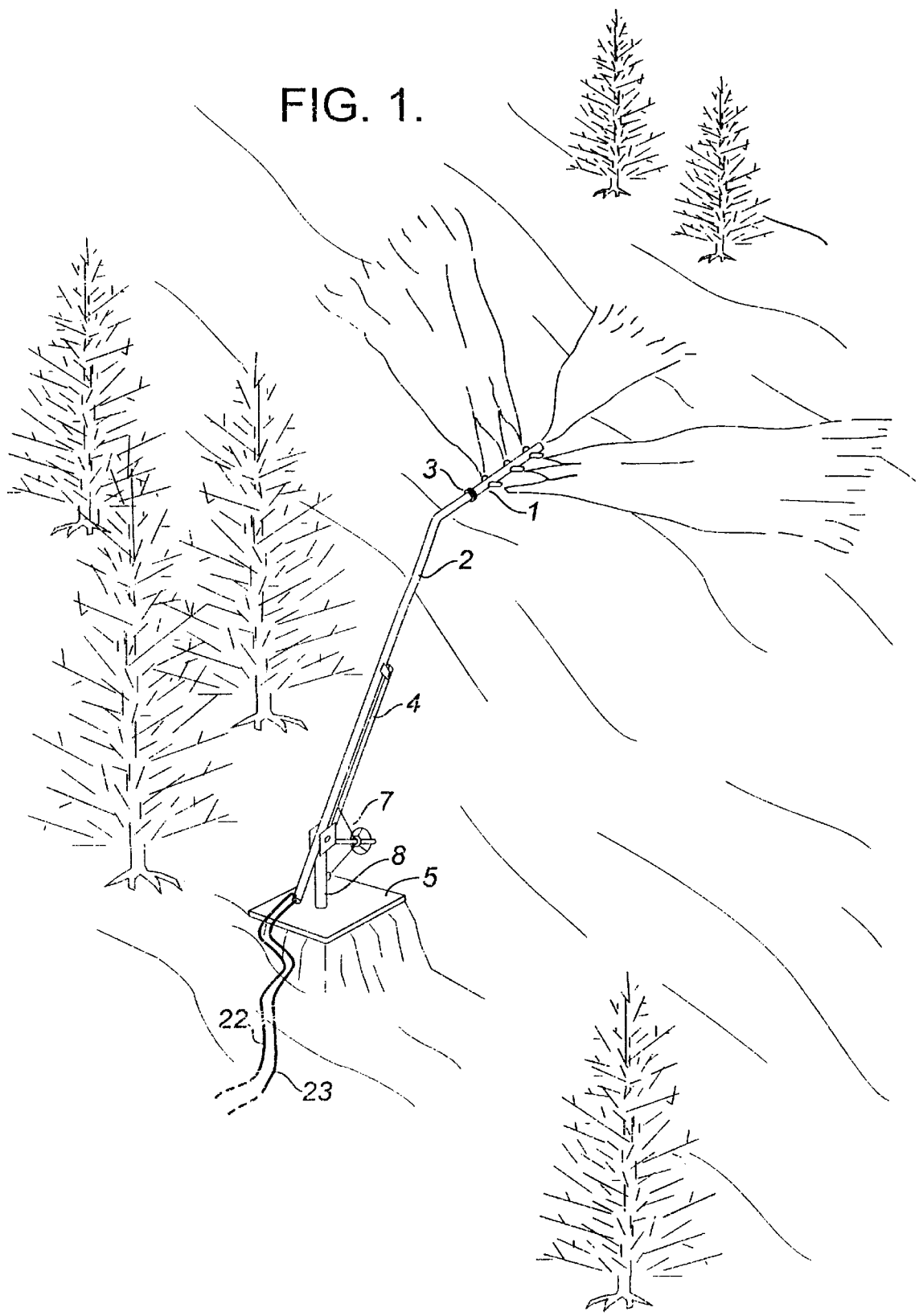
FIG. 1 is a perspective view showing a snow gun mounted on the end of a tower.

Having reference to FIG. 1, a snow gun 1 is shown mounted on the upper end of a tower 2 by a flanged connection 3. The tower 2 comprises a boom 4. The boom 4 is rotatably and pivotally supported by a base 5.

The base 5 comprises a mounting pipe 6 and lifting assembly 7. Mounting pipe 6 slides over a post 8 which projects from the ground. The lifting assembly 7 enables raising and lowering of the boom 4 to change the elevation of the gun 1 and to access it.

Figure 2:
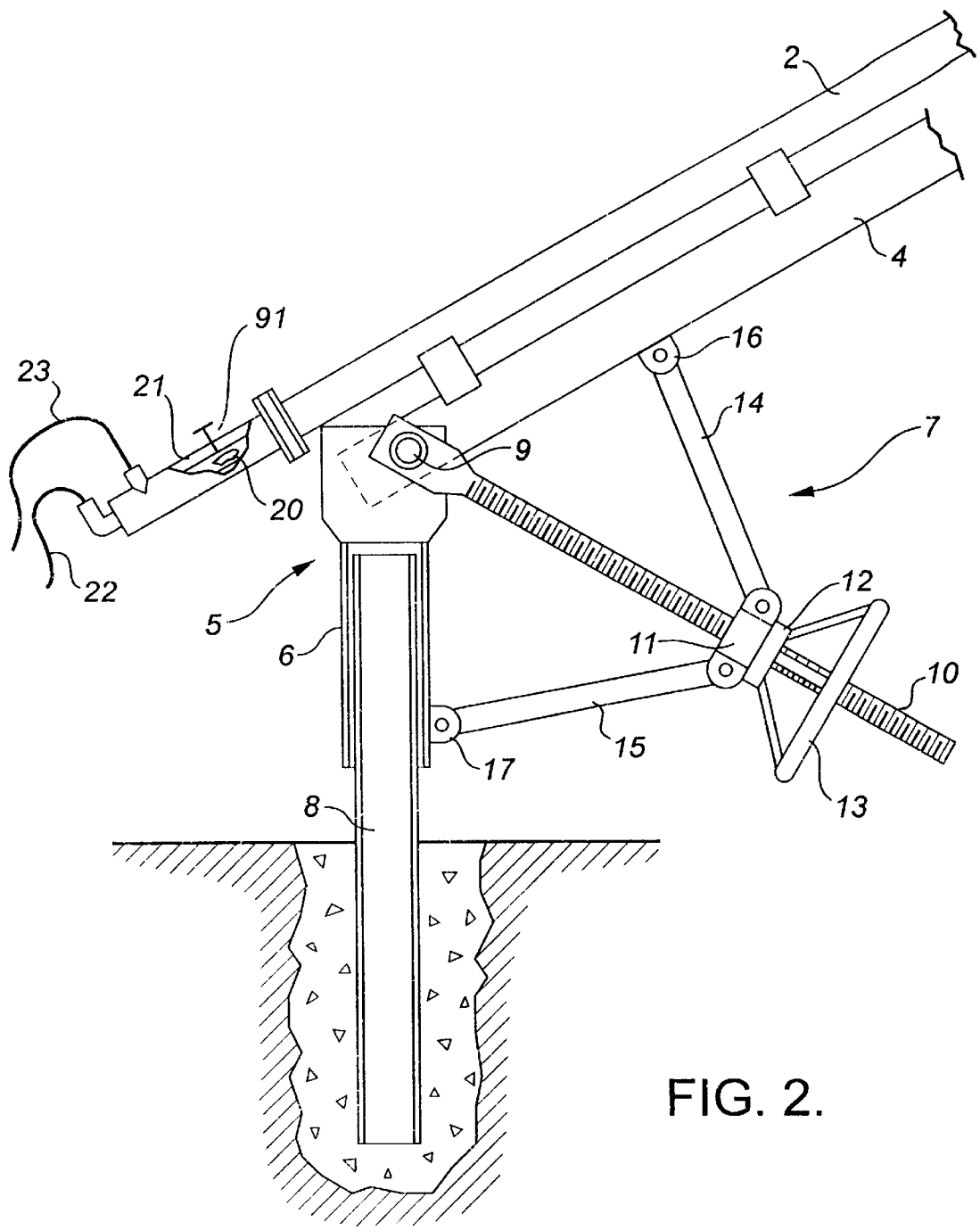
FIG. 2 is a side elevation, partly in section, showing the base, boom and lift assembly of the tower.

As shown in FIG. 2, the lifting assembly 7 comprises a pivot pin 9 connected with the mounting pipe 6 and passing through boom 4. A threaded jacking screw 10 is pivotally connected at one end with the pivot pin 9. A collar 11 is mounted on the jacking screw 10, for axial movement therealong. A threaded nut 12 engages the jacking screw 10 and functions to bias the collar 11 therealong. A handwheel 13 is attached to the nut 12 for rotation thereof. Two compression members 14, 15 are pivotally connected at their inner ends to the collar 11. The first compression member 14 is pivotally connected at its outer end to the boom 4 by pivot pin 16 at a point above pivot pin 9. The second compression member 15 is connected at its outer end to the mounting pipe 6 by a pivot pin 17 located below pivot pin 9. Thus, as the collar 11 is advanced along the jacking screw 10 toward pivot pin 9, compression members 14, 15 approach co-linear alignment and raise the boom 4.

This arrangement provides significant mechanical advantage and minimizes the height of the base 5. The minimal height enables a single operator to lift the mounting pipe 6 upwardly to clear the post 8 for un-mounting and transportation of the assembly to another site.

The tower 2 comprises inner and outer, co-extensive, concentric tubes 18, 19. The inner tube 18 forms an internal passageway 20. An annular passageway 21 is formed between the tubes 18, 19. The inner tube 18 can be connected by a quick-connect coupling (not shown) with an air hose 22 for the supply of pressurized or compressed air to the inner passageway 20. The outer tube 19 can be connected by a quick-connect coupling (not shown) with a water hose 23 for the supply of pressurized water to the annular passageway 21.

Figure 3:
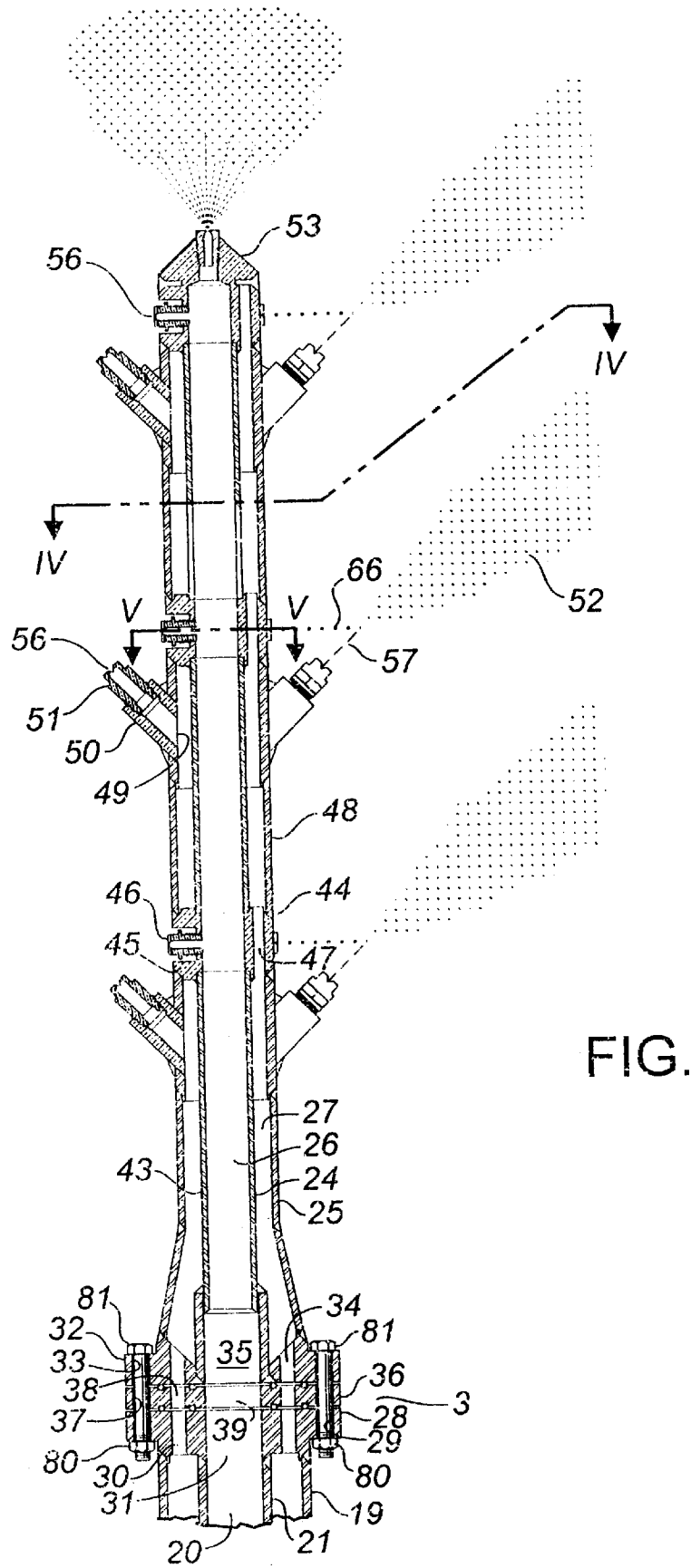
FIG. 3 is a cross-sectional side view of the snow gun.

As shown in FIG. 3, the snow gun 1 also comprises inner and outer, substantially co-extensive and concentric tubes 24, 25 forming an inner passageway 26 and outer annular passageway 27. The inner passageway 26 thus extends through the outer annular passageway 27 and is substantially co-extensive therewith. The tower and snow gun inner passageways 20, 26 are connected, as shown, as are the annular passageways 21, 27. (The inner passageways 20, 26 are hereafter referred to as the air passageways 20, 26 and the annular passageways 21, 27 are referred to as the water passageways 21, 27.)

The tower 2 is connected to the snow gun 1 by the flanged connection 3 having dual openings connecting the air passageways 20, 26 and water passageways 21, 27.

Figure 9:
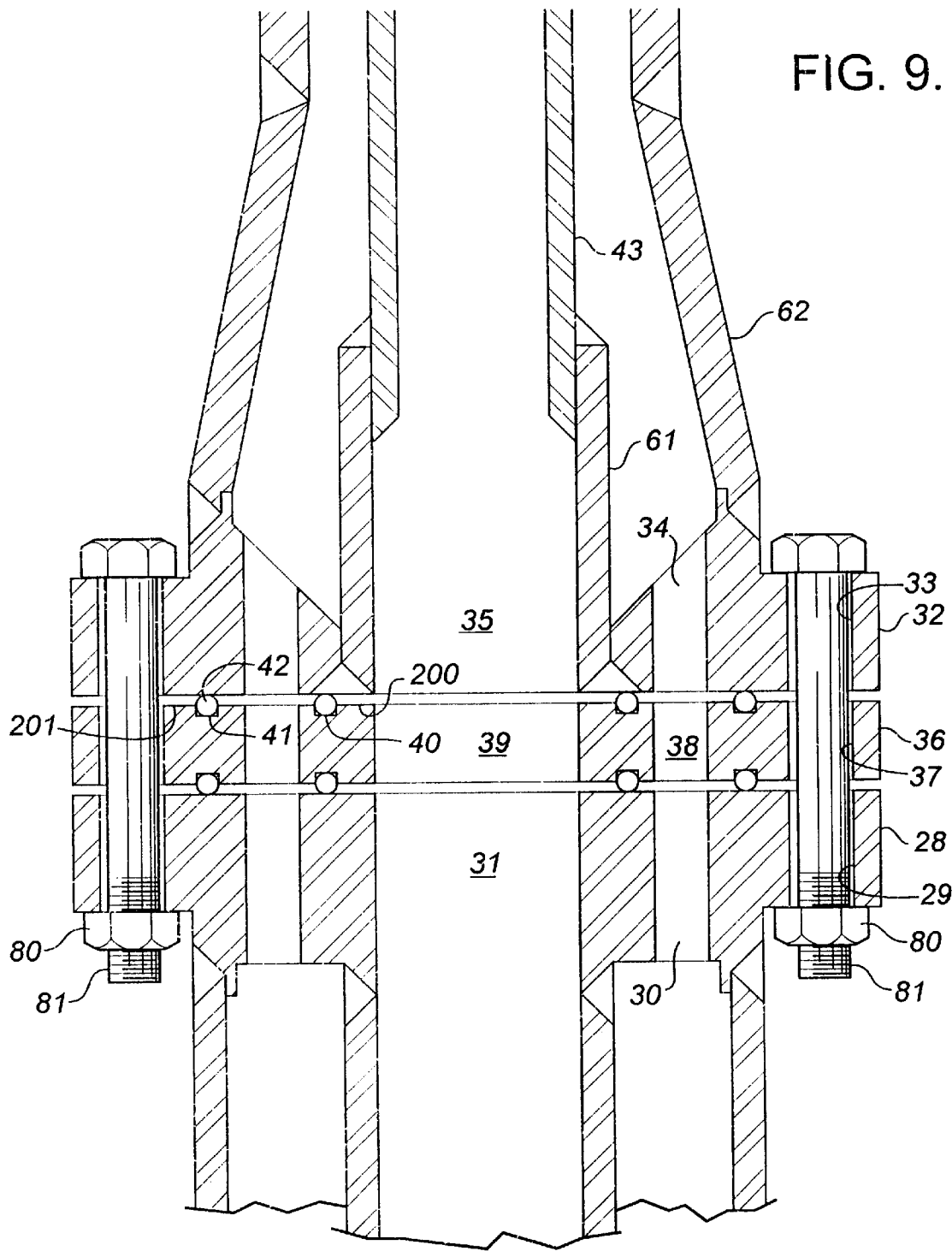
FIG. 9 is a side sectional view showing the flanged connection joining the snow gun with the tower.

The flanged connection 3 is designed to resist the high pressure differential between the water passageway (typically at 700 psi) and the air passageway (typically at 110 psi) and prevent leakage therebetween. Having reference to FIG. 9: the tower 2 is provided with a flat-faced (or non-grooved) tower flange 28 forming bolt openings 29, water passageway opening means 30 and air passageway opening 31. The snow gun 1 is provided with a flat-faced gun flange 32 forming bolt openings 33, water passageway opening means 34 and an air passageway opening 35. A plate 36 is provided between the tower and gun flanges 28, 32. The plate 36 also forms bolt openings 37, water passageway opening means 38 and an air passageway opening 39, positioned to register with the corresponding openings an opening means of the tower and gun flanges, to provide continuity of the water and air passageways. Inner and outer concentric grooves 40, 41 are formed in the annukar lands 200, 201 of the top and bottom faces of the plate 36, for receiving O-rings 42 for sealing the water and air passageways. The flanged connection 3 is completed by bolts 81 and nuts 80 securing together tower flange 28, plate 36 and gun flange 32.

Figure 10A:
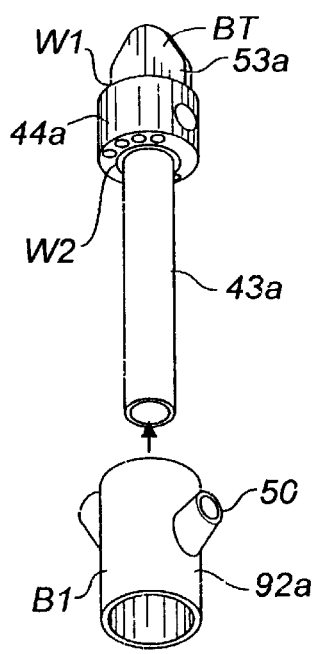
FIGS. 10A–10K show the fabrication sequence used in constructing the snow gun with welds.
Figure 10B:
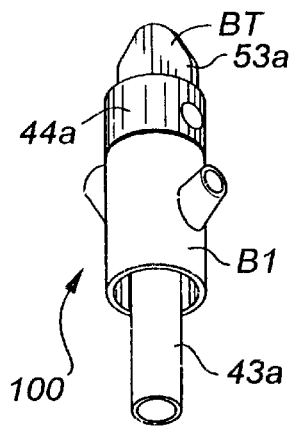
Figure 10C:
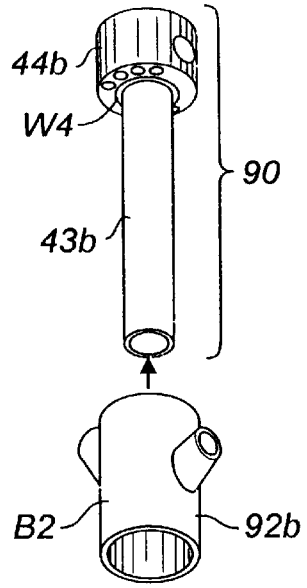
Figure 10D:
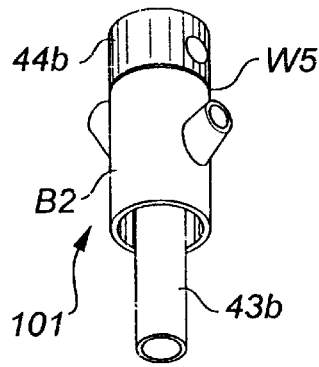
Figure 10E:
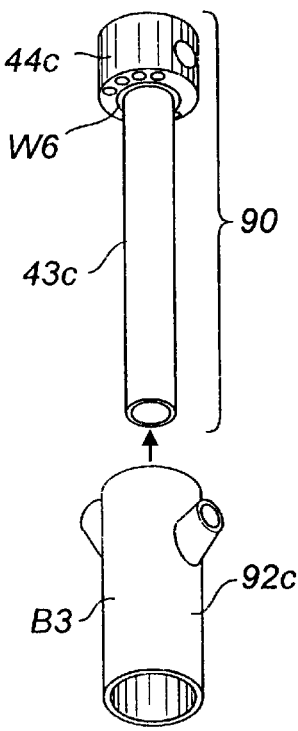
Figure 10F:
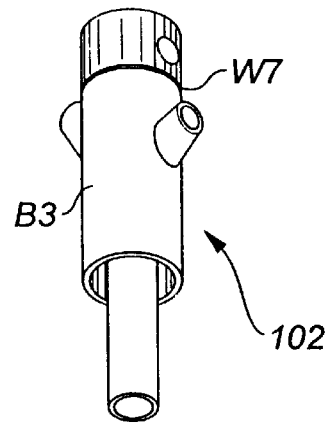
Figure 10G:
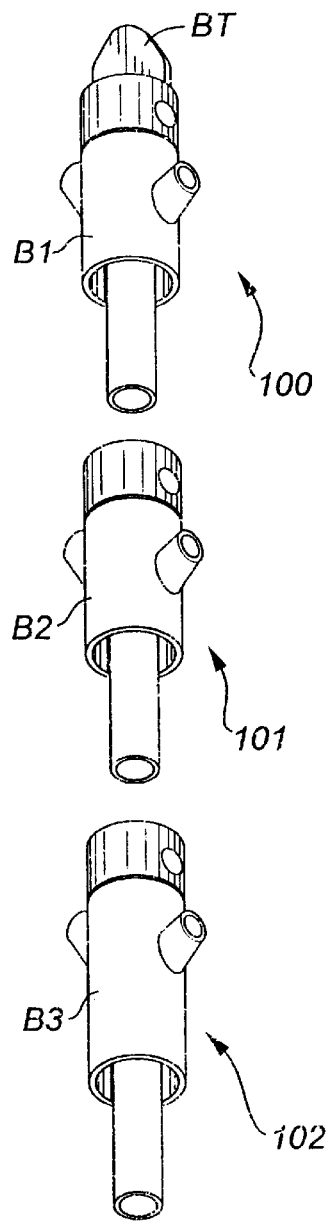
Figure 10H:
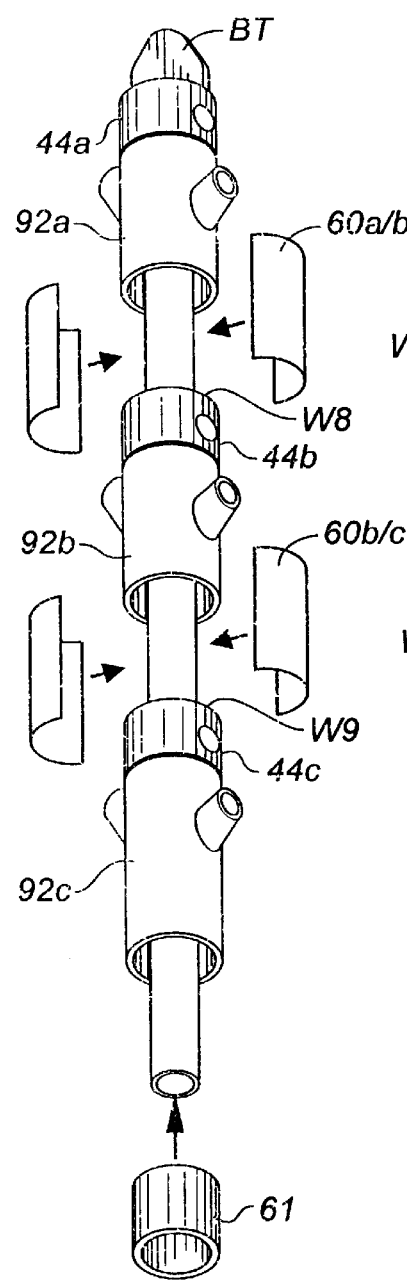
Figure 10I:
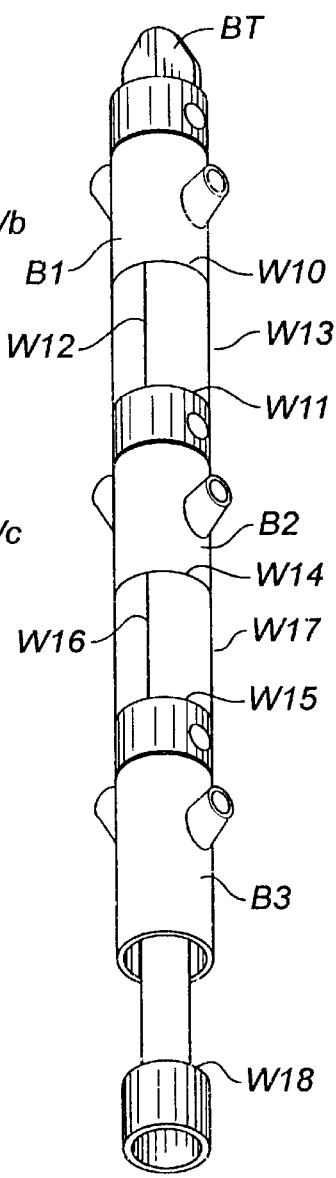
Figure 10J:
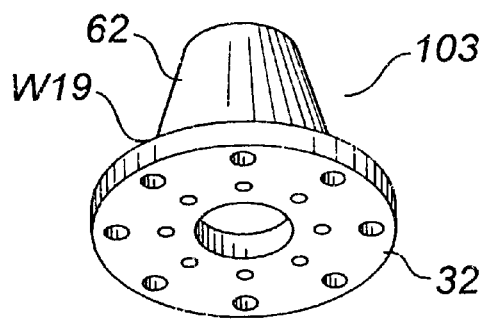

Having reference to FIG. 3, the snow gun's inner tube 24 comprises, from its inner end outward, a series of sequentially repeated needle valve units 90, (see FIG. 10C) joined end to end. Each unit 90 comprises a relatively thin-walled tube segment 43 joined to a relatively thick-walled ring 44.

Figure 5:
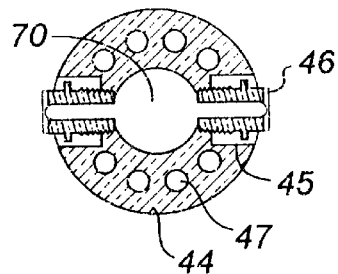
FIG. 5 is a plan view of a thick-walled ring, sectioned along the line B—B of FIG. 3.

Each thick-walled ring 44 (see FIG. 5) forms a pair of radial, internally threaded openings 45 for receiving V-jet air nozzles 46. When screw-threaded into the openings 45, the air nozzles 46 are generally diametrically aligned and are each fully embedded or recessed in the wall of the ring 44. The ring 44 further forms an axial central opening 70 which forms part of the air passageway 26 and a plurality of relatively small, axial openings 47 which form part of the water passageway 27. The radial openings 45 and the air nozzles 46 contained the therein communicate with the central opening 70, which forms part of the air passageway 26.

Figure 10K:
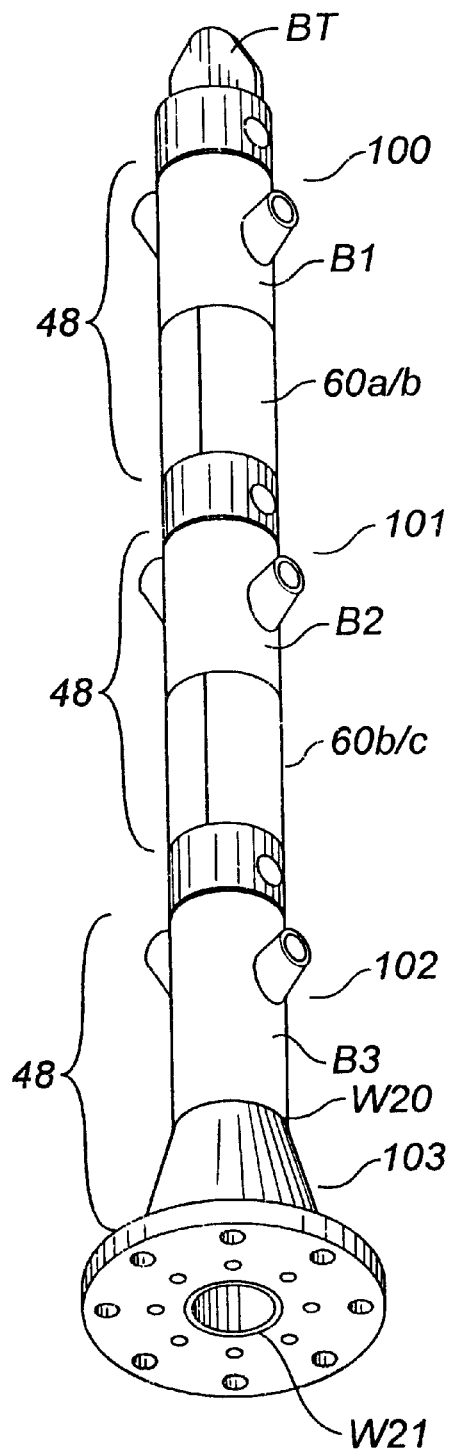

The snow gun's outer tube 25 comprises a series of sequentially repeated outer units 48 (see FIGS. 3, 10K). The innermost outer unit 48 joins the gun flange 32 and the innermost thick-walled ring 44. The remaining outer units segments 48 join adjacent pairs of thick-walled rings 44. Each outer unit 48 comprises a tube 92 and a tubular section formed of "doors" 60a/b, as described below.

Broadly stated, the inner and outer units 90, 48 combine to form a wall structure in which the air nozzles 46 are embedded and are insulated by the water moving through the structure.

Each outer unit 48 forms a pair of generally diametrically opposed openings 49 into which is welded an angularly directed, tubular dowel 50. Each dowel 50 is internally threaded. A V-jet water nozzle 51 is screwed into each dowel 50.

The dowels 50 are parallel so that the produced atomized plumes 52 do not coverge or intersect.

Figure 6:
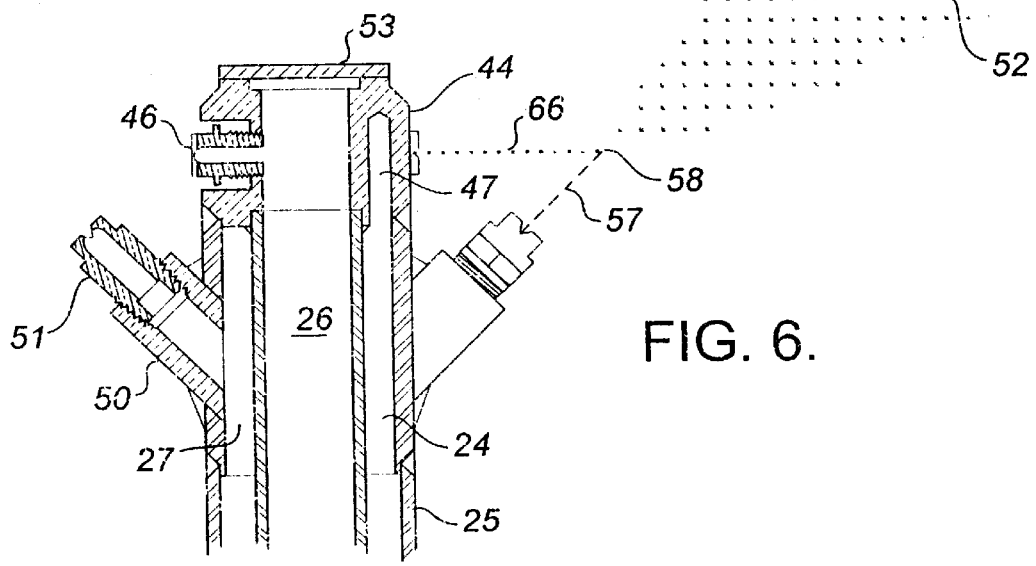
FIG. 6 is an expanded, partly sectional side view of the outer coupled banks of air and water nozzles of a snow gun having a blanked end.
Figure 8:
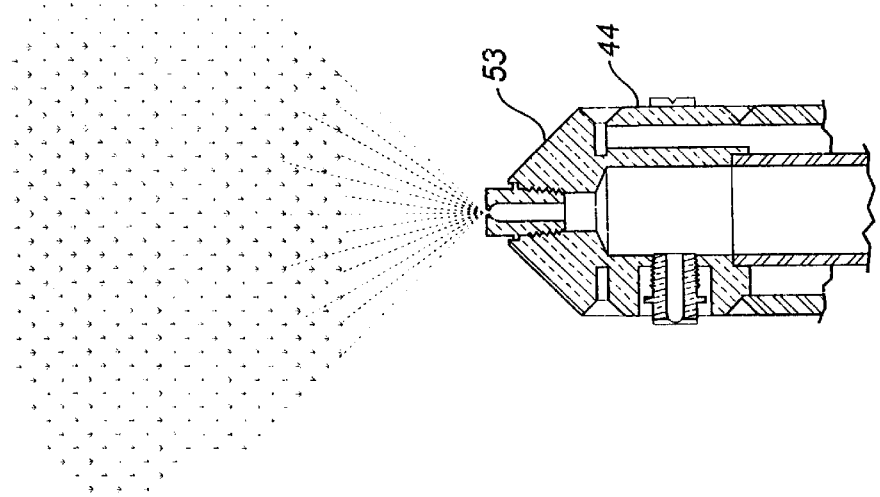
FIG. 8 is a side sectional view showing the end cap of FIG. 7, taken along a plane at 180° relative to that of FIG. 7.
Figure 7:
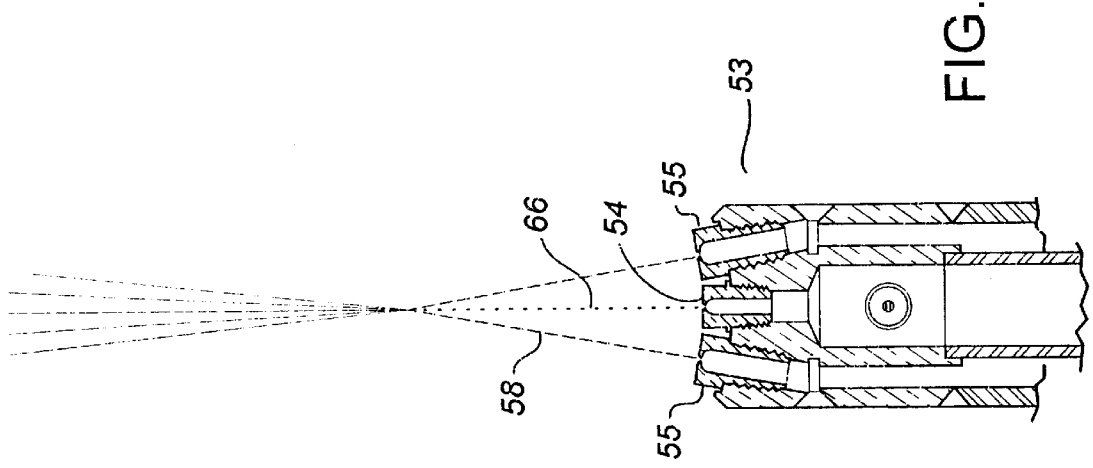
FIG. 7 is a side sectional view showing the nozzled end cap of FIG. 3.

At its outer end, the snow gun 2 is closed by a cap 53. The cap shown in FIGS. 3, 7 and 8 comprises an axially directed air nozzle 54 and a pair of angularly directed water nozzles 55. Alternatively, the cap 53 may simply blank off the end, as shown in FIG. 6.

The water and air nozzles 51, 46, 54, 55 all have shaped orifices 56 operative to produce a substantially flat and V-shaped spray or jet. Usually a 5020 air nozzle and 5040 water nozzle is the combination used.

Figure 4:
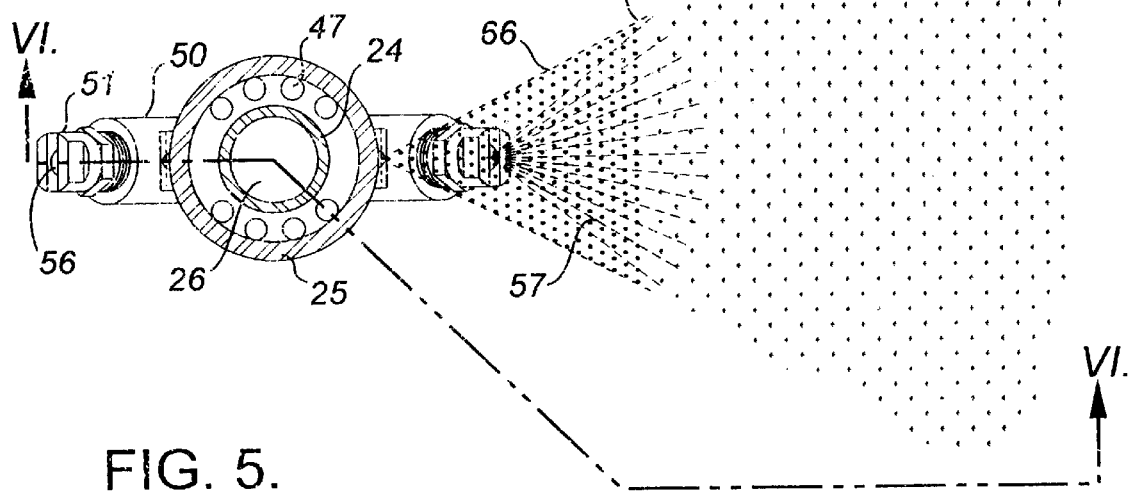
FIG. 4 is a top view, sectioned along the line A—A of FIG. 3, showing the intersecting, flat, V-shaped air jet and water spray of a coupled pairing of nozzles.

An outer air nozzle and inner water nozzle are coupled or relatively positioned as shown in FIG. 3, so that the air jet 66 intercepts the water spray 57 along an imaginary line 58 where the widths of the jet and spray are substantially equal (see FIG. 4). A plume 52 of atomized water is produced.

The snow gun is constructed by welding in order to avoid leakage, given that water and air at relatively high pressure are passing therethrough.

A novel snow gun structure and welding fabrication sequence has been developed in order to enable the provision of a plurality of thick-walled rings 44. More particularly, as shown in FIGS. 10a–10k:

a thick-walled ring 44a is welded to a cap 53a at W1;

an inner tube segment 43a is seated in the inner end of the ring 44a and welded thereto at W2;

an outer tube 92a, having water nozzle dowels 50, is slid onto inner tube segment 43a and welded to ring 44a at W3 to produce unit 100;

in a separate second sequence, an inner tube segment 43b is welded to the inner end of a thick-walled ring 44b at W4—an outer tube 92b is slid onto segment 43b and welded thereto at W5 to produce unit 101;

in a separate third sequence, an inner tube segment 43c is welded to the inner end of a thick-walled ring 44c at W6—an outer tube 92c is slid onto segment 43c and welded thereto at W7 to produce unit 102;

unit 101 is slid onto unit 100 so that the inner end of inner tube segment 43a seats in the outer end of thick-walled ring 44b and is welded at W8;

similarly, unit 102 is slid onto unit 101 so that the inner end of inner tube segment 43b seats in the outer end of thick-walled ring 44c and is welded at W9;

pairs of doors 60a/b and 60b/c are then emplaced to close in the space between outer tube 92a and ring 44b and outer tube 92b and ring 44c respectively and are welded at W10–W17 as shown;

a collar 61 is slid onto the inner end of inner tube segment 43c and welded at W18;

a separate fourth sequence, a frusto-conical tube 62 is welded to gun flange 32 at W19 to produce unit 103;

unit 103 is then slid onto inner tube segment 43c and is welded to outer tube 92c at W20; and bottom collar 61 is welded to the gun flange 32 to complete the assembly of the snow gun.

The snow gun and its operation has been described in the context of air being supplied to the inner conduit passageway 26 and water being supplied to the outer annular passageway 27. This is the mode in which the gun will likely be operated most of the time. However, because V-jet nozzles are used in all of the fluid outlets, the air and water supply can be switched to passageway 27 and passageway 26 respectively, when appropriate.

Figure 12:
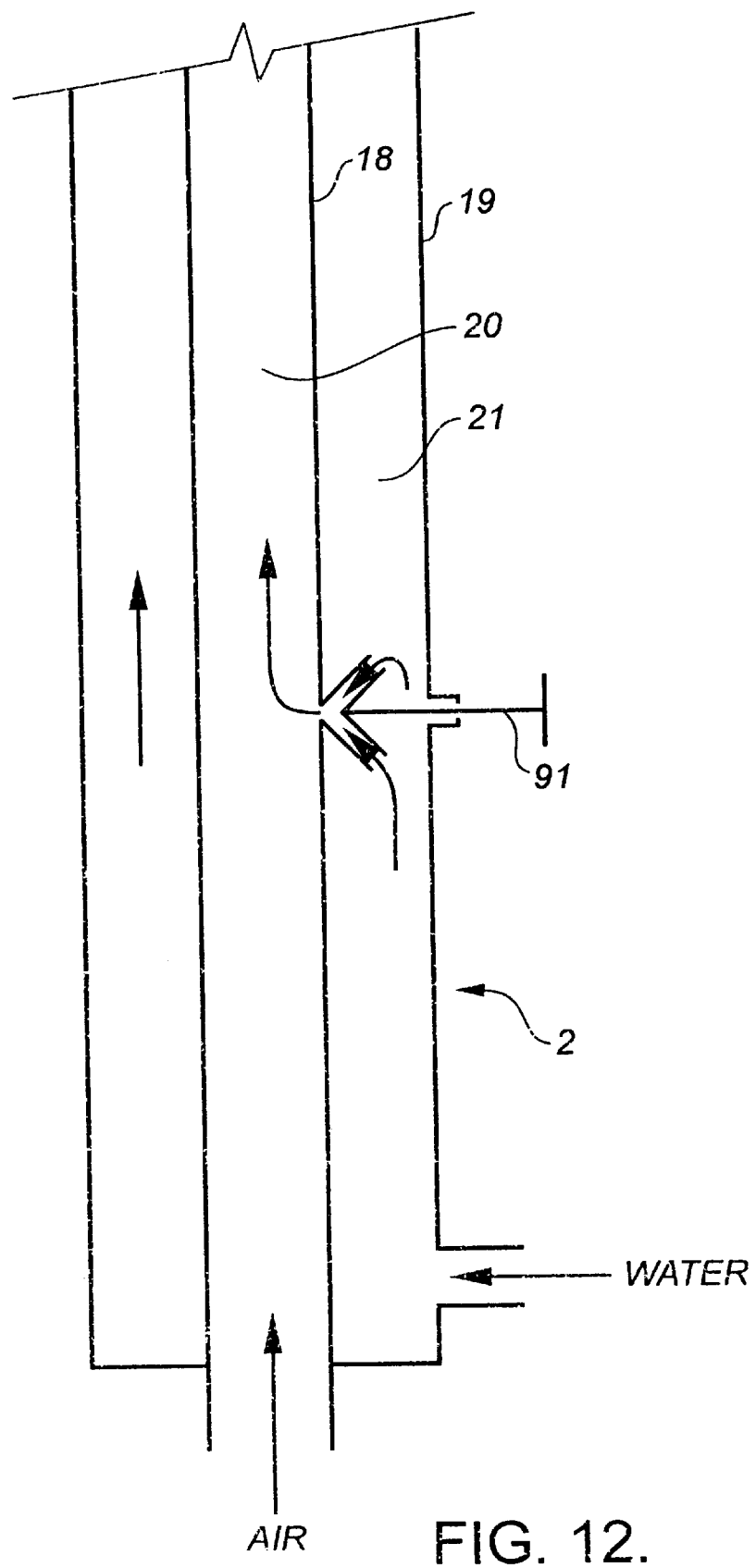
FIG. 12 is a sectional side view of part of the tower, showing a bleed valve for bleeding water into the air stream.

As shown in FIGS. 2 and 12, a cross-mix needle valve 91 can be provided for bleeding a small stream of water (typically about 5 U.S. gpm) from the annular passage 21 into the inner tube passageway 20, for melting rime ice formed therein, when desirable. It has been found desirable to wet the air stream when temperatures drop below −8° C. (17° F.).

An example is now given to report on a test in which a snow gun in accordance with the invention was operated to produce snow at freezing temperatures milder than −6° C.

Figure 11:
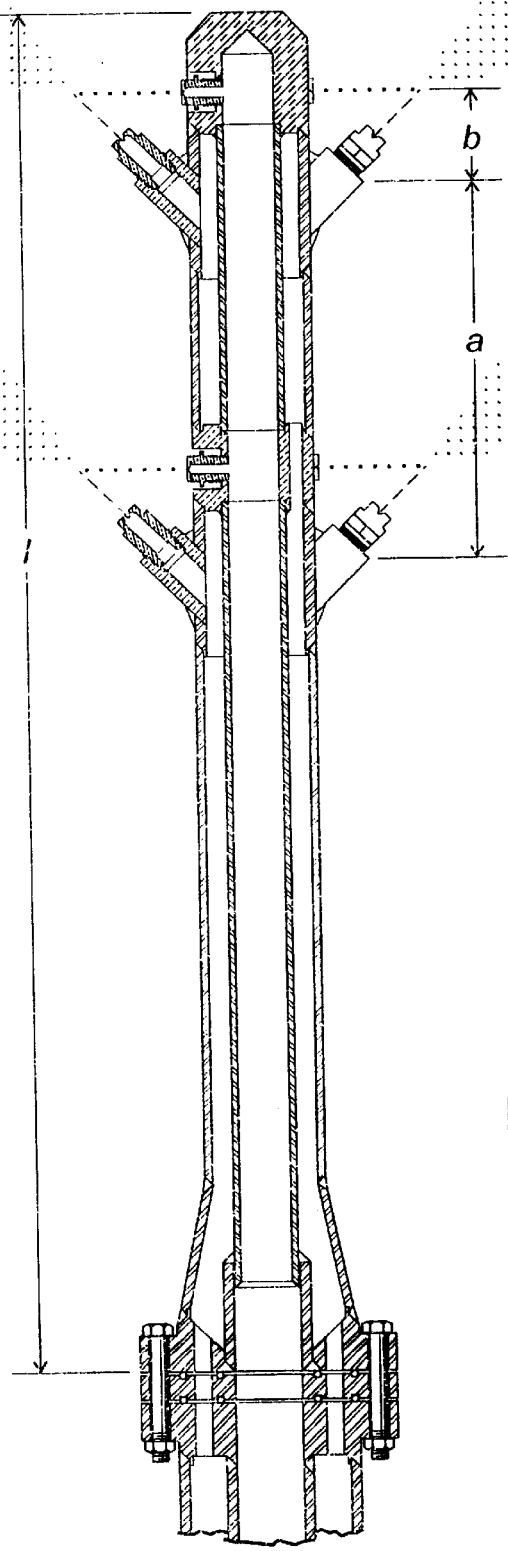
FIG. 11 is a sectional side view showing the two bank snow gun used to provide the data of Example I.

More particularly, a snow gun in accordance with FIG. 11 and having the dimensions set forth in Table I was built and tested.

TABLE I gun length l = 2.5 feet;
outer tube: 2" O.D. Schedule 80 aluminum pipe;
inner tube: 1¼" O.D. aluminum tubing having an I.D. of 1";
thick-walled ring having ¼" O.D. water openings, a 1" central air opening and ¼ "NPT nozzle connections;
air nozzles - 5020;
air nozzle angle - 90° to gun axis;
water nozzles - 5020;
angle of first bank of water nozzles - 45°;
angle of second bank of water nozzles - 45°;
distance a between first and second bank - 8";
distance b between the center of each dowel opening and the center of each air nozzle - 2½".

When tested at the following conditions: −1.5° C., 85% humidity, 40 U.S. gpm at 600 psig, 100 cfm air at 100 psi; the gun produced good base snow.

The scope of protection to be accorded the invention is now set forth in the following claims.

What is claimed is:

1. A flanged connection for use in joining a snow gun, having a central passageway for conveying pressurized air and an outwardly spaced passageway for conveying pressurized water, and a tower, having similar inner and outer passageways for air and water, comprising:

a tower flange, having a flat face and forming central and outwardly spaced first openings, for connection with the tower so that the first openings connect with the tower passageways;

a snow gun flange, having a flat face and forming central and outwardly spaced second openings, for connection with the snow gun so that the second openings connect with the snow gun passageways; and a plate having a side edge, for positioning between the tower flange and snow gun flange, the plate having first and second faces and forming central and outwardly spaced third openings for connecting the first and second openings, each of the first and second faces having a first land between the central opening and the outwardly spaced opening and a second land between the outwardly spaced opening and the side edge of the plate, said first land forming a first O-ring groove surrounding the plate's central opening and said second land forming a second O-ring groove concentric with the first O-ring groove.

2. The flange connection as set forth in claim 1 wherein: the outwardly spaced first, second and third openings are annular and concentric with the central first, second and third openings respectively.

* * * * *